PARTICLE ACCELERATOR HAVING TUNABLE HIGH FREQUENCY POWER SUPPLY

Filed Dec. 16, 1964

INVENTOR:
J. C. SCHNURIGER

BY Paul M. Craig, Jr.
ATTORNEY

United States Patent Office 3,426,231
Patented Feb. 4, 1969

3,426,231

PARTICLE ACCELERATOR HAVING TUNABLE HIGH FREQUENCY POWER SUPPLY

Jean Claude Schnuriger, Paris, France, assignor to CSF—Compagnie Generale de Telegraphie Sans Fil, Paris, France Filed Dec. 16, 1964, Ser. No. 418,607
Claims priority, application France, Dec. 17, 1963, 957,393
U.S. Cl. 313—62 9 Claims
Int. Cl. H05h 13/00

ABSTRACT OF THE DISCLOSURE

A cyclotron, wherein the resonant circuit formed by each of D electrodes and its support is tuned by rotating a panel extending radially in a box having a part thereof in the form of a cylindrical sector, said support extending into said box and having its extremity fixed to the back wall thereof.

Figure 1:
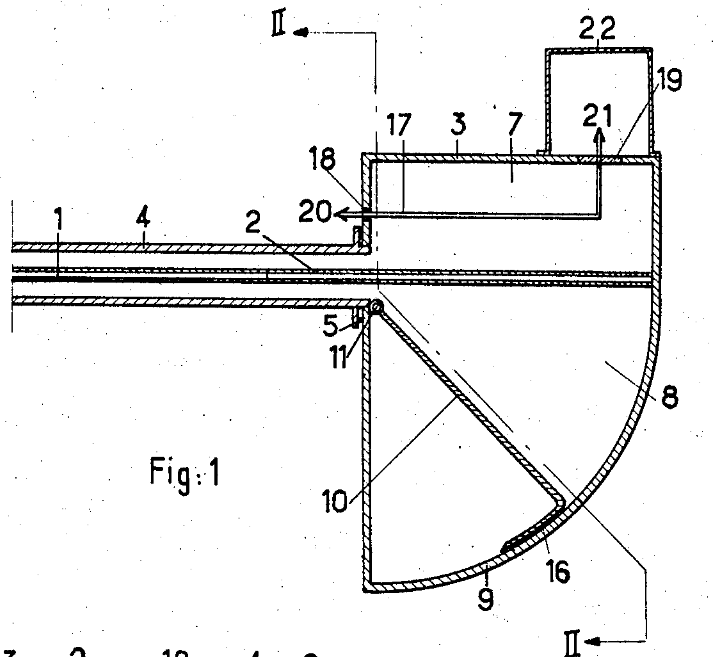

The present invention relates to resonant circuits of circular particle accelerator electrodes, in particular to the circuits of the D electrodes of cyclotrons. More particularly, the present invention relates to tuning devices of these circuits, tuning for which a need exists, as is known, to cause the cyclotron to operate with an excitation having variable frequency in order to cause the extraction energy of the accelerated particles to vary within the relativistic domain, or to be able to accelerate with one and the same cyclotron different particles.

D circuits in which the support of the D's is extended by a box equivalent of an inductance are shown in the art. Also known is the principle of tuning variation of these circuits by variation of the equivalent inductance of this box. In a known device, the box was parallelepipedic, and the inductance adjusting device comprised a series of foldable panels in the form of a folding screen on the inside of the box, the width of these panels occupying completely the width of the box. The folding of these panels necessitated an extremely complicated control device, and even though the system in question assured a variation of resonance frequency within a satisfactory band, within the ratio of 1:3 in particular, the mechanical complication was such that the system presented little industrial interest.

The object of the present invention is a circular particle accelerator, such as a cyclotron, of which the D electrodes fed with the high frequency are carried by supports extended by boxes equivalent of an inductance, and in which the tuning device of the D circuit is, with comparable performance, considerably simplified.

The invention is characterized by the fact that the box comprises at least one portion in the form of a cylindrical sector, and that the tuning is effected by a single panel or shutter, of width representing only a portion of that of the box, this panel extending along the radius of the cylindrical portion and being fixed on a shaft pivoting in coincidence with the axis of the cylinder.

According to a further characteristic of the present invention the width of the panel is substantially equal to the width of the D support.

According to still a further feature of the present invention the panel carries at its free extremity a cylindrical piece whose surface faces the cylindrical wall of the box, and whose width is substantially equal to that of the box.

Accordingly, it is an object of the present invention to provide a tuning mechanism for resonant electrode circuits of circular particle accelerators which obviates by extremely simple means the aforementioned shortcomings and drawbacks encountered with the prior art constructions.

Another object of the present invention resides in the provision of a tuning device for resonant electrode structures of circular particle accelerators which is extremely simple in structure, easy to adjust and relatively inexpensive to manufacture and assemble.

A further object of the present invention resides in the provision of a tuning device for resonant electrode structures of circular particle accelerators which is not only simple in structure but assures tuning over a satisfactory frequency band.

Figure 3:
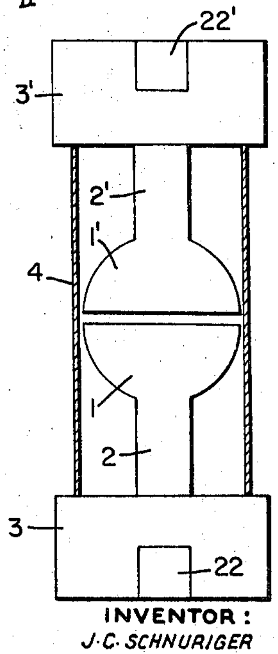
Figure 2:
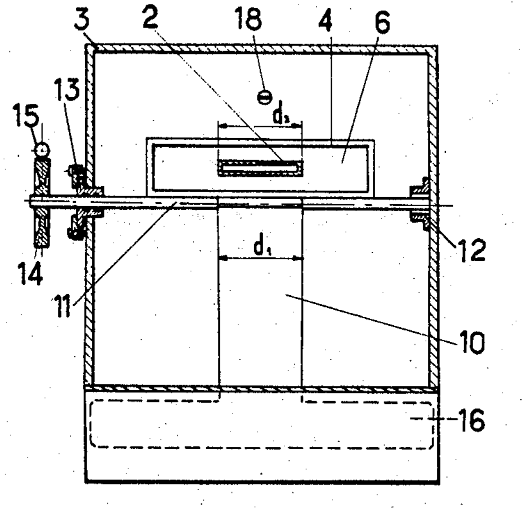

These and other objects, features and advantages of the present invention will become more obvious from the following description when taken in connection with the accompanying drawing which shows, for purposes of illustration only, one embodiment in accordance with the present invention, and wherein:

FIGURE 1 is a transverse cross sectional view of a portion of a cyclotron provided with a tuning mechanism in accordance with the present invention, FIGURE 2 is a transverse cross sectional view, perpendicular to the cross sectional view of FIGURE 1 and taken along line II—II of FIGURE 1, FIGURE 3 is a plane view of the assembly of two resonant circuits each comprising a D, a support thereof and a tuning mechanism, FIGURE 1 being a longitudinal sectional view of FIGURE 3.

Referring now to the drawing wherein like reference numerals are used throughout the two views to designate like parts, FIGURE 1 illustrates in transverse cross section a portion of a D cyclotron electrode 1, carried by a support 2 in the form of a flat hollow beam or girder whose transverse cross section perpendicular to that of FIGURE 1 is visible in FIGURE 2. The support 2 extends into a box 3, and its extremity is fixed to the backwall of this box thereby coupling energy from the box 3 to electrode 1 through support 2. The evacuated box 4, in which are located the D electrodes of the cyclotron as well as all the other essential elements of conventional construction (not shown), such as the particle source, the target and the deflectors is connected by means of a vacuum-tight joint 5 to the rims of the aperture 6 in the front face of the box 3, while the support 2 extends through the aperture 6 into the box 3.

FIGURE 3 shows a plane view of a D system of the cyclotron together with their supports and tuning mechanisms. The D system, provided as one example of many conventional assemblies, comprising two active D's 1 and 1', each in the form of a 180° sector. The D 1 is supported by a support 2 and extends into a tuning box 3 carrying a cage 22 for a high frequency amplifier. The symmetrical D 1' is supported by a support 2' and extends into a tuning box 3' carrying a cage 22' for a high frequency amplifier. The longitudinal section of elements 1, 2, 3, and 22 is provided in FIGURE 1. The D's 1, 1' together with their supports 2, 2' are located within an evacuated casing 4 shown in horizontal cross section in FIGURES 1 and 2.

According to the present invention, the box 3 comprises at least one portion in the form of a cylindrical sector. In the illustrated embodiment, the box 3 comprises a parallelepipedic portion 7 above the support beam or girder 2, connected to a portion 8 below the support 2, this portion 8 having the form of a cylindrical sector of 90°, and the sector being limited by the cylindrical surface 9.

According to another feature of the present invention, the tuning of the circuit formed by the D electrode 1, the support 2 and the box 3 takes place by causing the equivalent inductance of the box 3 to vary by means of the displacement of a single panel or shutter 10, extending along the radius of the surface 9 and fixed to a shaft 11 coincident with the axis of the cylinder of which the surface 9 forms a part.

As shown in FIGURE 2, the shaft 11 may turn within a thrust bearing 12 fixed to a lateral wall of the box 3, and traverses the opposite lateral wall through a tight joint or seal 13. On the outside of the box 3, the shaft 11 is adapted to be actuated by a mechanism comprising a pinion 14 and a worm 15.

It may be seen readily that this tuning mechanism is considerably simplified as compared to the known mechanism of folding several panels in the form of a foldable screen. Tests have shown, nevertheless, that if the width of the panel 10 occupied the entire width of the box 3, as was the case for the panels disposed in the parallelepipedic box of the known system, this simplification would have as consequence a reduction of the performance in the form of a diminution of the tuning band, which would then be only of the order of 1:1.7.

In accordance with the present invention, based on experimental results, these performances may be re-established and the limits of the tuning band may be of the order of 1:3 as in the known prior art system, if the width of the panel 10 occupies only a small portion of that of the box 3, a relative optimum being noticed when this width is substantially equal to that of the support 2.

It is for that reason, according to still another feature of the present invention as shown by the drawing that the width $d_1$ of the panel 10 is equal to the width $d_2$ of the support 2.

According to another feature of the present invention, the performances are further improved by a cylindrical piece 16 carried by the free extremity of the panel 10 and having a width substantially equal to that of the box 3. The surface of this piece 16 faces the cylindrical surface 9 of the wall of the box 3 and forms with the same a fixed capacity. Tests have shown that this capacity is favorable to the enlargement of the tuning band.

The box 3 is excited with high frequency by a loop 17 in the form of a thin plate bent at right angle, traversing the box 3 through the insulating passages 18 and 19 and connected at 20 to the high direct-current voltage, and at 21 to an anode circuit of a high frequency amplifier (not shown) and located within a cage 22 placed directly over the box 3.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A circular particle accelerator of the cyclotron type having a pair of electrodes and supply means for supplying said electrodes with high frequency power, comprising:

supporting means for each of said electrodes,
box means electrically equivalent of an inductance,
each of said supporting means being connected to a respective box means,
and each of said electrodes forming a resonant circuit with the corresponding supporting means and the corresponding box means,
each box means having a plurality of walls, one of said walls being at least in part shaped to form a cylindrical sector,
a single panel extending radially into a respective box means and having a width of only a fraction of the width of said box means,
means for rotatably supporting said panel including a shaft extending substantially along the axis of the cylinder of which the cylindrical sector forms a part,
and means for rotating said panel about the axis of said shaft to thereby vary the tuning of said resonant circuit.

2. A circular particle accelerator of the cyclotron type having a pair of electrodes and supply means for supplying said electrodes with high frequency power, comprising:

supporting means for each of said electrodes,
box means electrically equivalent of an inductance,
each of said supporting means being connected to a respective box means,
and each of said electrodes forming a resonant circuit with the corresponding supporting means and the corresponding box means,
each box means having a plurality of walls, one of said walls being at least in part shaped to form a cylindrical sector,
a single panel extending radially into a respective box means and having a width of only a fraction of the width of said box means,
means for rotatably supporting said panel including a shaft extending substantially along the axis of the cylinder of which the cylindrical sector forms a part,
and means for rotating said panel about the axis of said shaft to thereby vary the tuning of said resonant circuit,
the width of said supporting means being substantially equal to the width of said panel.

3. A circular particle accelerator of the cyclotron type having a pair of electrodes and supply means for supplying said electrodes with high frequency power, comprising:

supporting means for each of said electrodes,
box means electrically equivalent of an inductance,
each of said supporting means being connected to a respective box means,
and each of said electrodes forming a resonant circuit with the corresponding supporting means and the corresponding box means,
each box means having a plurality of walls, one of said walls being at least in part shaped to form a cylindrical sector,
a single panel extending radially into a respective box means and having a width of only a fraction of the width of said box means,
means for rotatably supporting said panel including a shaft extending substantially along the axis of the cylinder of which the cylindrical sector forms a part,
and means for rotating said panel about the axis of said shaft to thereby vary the tuning of said resonant circuit,
the edge of said panel remote from said axis carrying a conductive cylindrical sheet having a surface facing the internal wall of said cylindrical part of said box means, thereby forming a fixed capacitance with said internal wall.

4. A circular particle accelerator of the cyclotron type having a pair of electrodes and supply means for supplying said electrodes with high frequency power, comprising:

supporting means for each of said electrodes,
box means electrically equivalent of an inductane,
each of said supporting means being connected to a respective box means,
and each of said electrodes forming a resonant circuit with the corresponding supporting means and the corresponding box means,
each box means having a plurality of walls, one of said walls being at least in part shaped to form a cylindrical sector,
a single panel extending radially into a respective box means and having a width of only a fraction of the width of said box means,
means for rotatably supporting said panel including a shaft extending substantially along the axis of the cylinder of which the cylindrical sector forms a part, and means for rotating said panel about the axis of said shaft to thereby vary the tuning of said resonant circuit, the edge of said panel remote from said axis carrying a conductive cylindrical sheet having a surface facing the internal wall of said cylindrical part of said box means, thereby forming a fixed capacitance with said internal wall, and the width of said cylindrical sheet being substantially equal to the width of said box means.

5. A circular particle accelerator of the cyclotron type having a pair of electrodes and supply means for supplying said electrodes with high frequency power, comprising:

supporting means for each of said electrodes, box means electrically equivalent of an inductance, each of said supporting means being connected to a respective box means, and each of said electrodes forming a resonant circuit with the corresponding supporting means and the corresponding box means, each of said box means having a plurality of walls, one of said walls being at least in part shaped to form a cylindrical sector, a single panel extending radially into a respective box means and having a width of only a fraction of the width of said box means, means for rotatably supporting said panel including a shaft extending substantially along the axis of the cylinder, of which the cylindrical sector forms a part, and means for rotating said panel about the axis of said shaft, to thereby vary the tuning of said resonant circuit, said supply means including a metallic loop traversing a respective box means and having two extremities, one connected to the high direct voltage source and the other connected to the anode circuit of a high frequency amplifier.

6. A circular particle accelerator of the cyclotron type having a pair of electrodes and supply means for supplying said electrodes with high frequency power, comprising:

supporting means for each of said electrodes, box means electrically equivalent of an inductance, each of said supporting means being connected to a respective box means, and each of said electrodes forming a resonant circuit with the corresponding supporting means and the corresponding box means, each box means having a plurality of walls, one of said walls being at least in part shaped to form a cylindrical sector, a single panel extending radially into a respective box means and having a width of only a fraction of the width of said box means, means for rotatably supporting said panel including a shaft extending substantially along the axis of the cylinder of which the cylindrical sector forms a part, and means for rotating said panel about the axis of said shaft to thereby vary the tuning of said resonant circuit, the width of said supporting means being substantially equal to the width of said panel, the edge of said panel remote from said axis carrying a conductive cylindrical sheet having a surface facing the internal wall of said cylindrical part of said box means, thereby forming a fixed capacitance with said internal wall, and the width of said cylindrical sheet being substantially equal to the width of said box means.

7. In a circular particle accelerator of the type having a pair of electrodes, support means for said electrodes, and supply means for supplying said electrodes with high frequency power, the improvement comprising a tuning mechanism for tuning the resonant circuit formed by a respective electrode, support means and an inductance, box means forming said inductance and having a wall at least in part shaped to form a body of revolution, each support means being connected to a respective box means, and means for varying the tuning of a respective resonant circuit including panel means extending substantially radially into a respective box means and having a width of only a fraction of the width of said box means, and means for rotating said panel means substantially about the axis of said body of revolution, the width of said support means being substantially equal to the width of said panel means.

8. In a circular particle accelerator of the type having a pair of electrodes, support means for said electrodes, and supply means for supplying said electrodes with high frequency power, the improvement comprising a tuning mechanism for tuning the resonant circuit formed by a respective electrode, support means and an inductance, box means forming said inductance and having a wall at least in part shaped to form a body of revolution, each support means being connected to a respective box means, and means for varying the tuning of a respective resonant circuit including panel means extending substantially radially into a respective box means and having a width of only a fraction of the width of said box means, and means for rotating said panel means substantially about the axis of said body of revolution, the width of said support means being substantially equal to the width of said panel means, and means providing a substantially fixed capacitance including a further member having a surface facing the inside of said wall.

9. In a circular particle accelerator of the type having a pair of electrodes, support means for said electrodes, and supply means for supplying said electrodes with high frequency power, the improvement comprising a tuning mechanism for tuning the resonant circuit formed by a respective electrode, support means and an inductance, box means forming said inductance and having a wall at least in part shaped to form a body of revolution, each support means being connected to a respective box means, and means for varying the tuning of a respective resonant circuit including panel means extending substantially radially into a respective box means and having a width of only a fraction of the width of said box means, and means for rotating said panel means substantially about the axis of said body of revolution, the width of said support means being substantially equal to the width of said panel means, and means providing a substantially fixed capacitance including a further member having a surface facing the inside of said wall, and the width of said further member being substantially equal to the width of a respective box means.

References Cited

UNITED STATES PATENTS

| | | | |
|---|---|---|---|
| 2,513,334 | 7/1950 | Kirkman | 333—83 X |
| 2,659,000 | 11/1953 | Salisbury | 313—62 X |

FOREIGN PATENTS

| | | |
|---|---|---|
| 307,494 | 5/1955 | Switzerland. |

JAMES W. LAWRENCE, *Primary Examiner.*

R. F. HOSSFELD, *Assistant Examiner.*

U.S. Cl. X.R.

328—234